United States Patent [19]

Hopkinson et al.

[11] Patent Number: 4,987,511

[45] Date of Patent: Jan. 22, 1991

[54] GAPPED ARRESTER

[75] Inventors: Philip J. Hopkinson; George W. Mayall, both of Zanesville, Ohio

[73] Assignee: Cooper Industries, Inc., Houston, Tex.

[21] Appl. No.: 428,876

[22] Filed: Oct. 30, 1989

Related U.S. Application Data

[63] Continuation of Ser. No. 164,652, Mar. 7, 1988, abandoned.

[51] Int. Cl.[5] ........................................ H02H 9/04

[52] U.S. Cl. ........................................ 361/35; 361/40; 361/126; 361/127

[58] Field of Search ........................ 361/35, 38, 39, 40, 361/111, 117, 126, 120, 130, 104, 127

[56] References Cited

U.S. PATENT DOCUMENTS

| | | | |
|---|---|---|---|
| 2,018,672 | 10/1935 | Hill | 361/127 |
| 3,588,606 | 6/1971 | Ristuccia | 361/104 |
| 3,666,992 | 5/1972 | Goodman | 361/39 |
| 4,743,996 | 5/1988 | Bock | 361/39 |

*Primary Examiner*—Todd E. Deboer
*Attorney, Agent, or Firm*—Gregory L. Maag; David A. Rose; Ned L. Conley

[57] ABSTRACT

A gapped low voltage bushing (10) comprising a controlled spark gap (1), a metallic arc strap (18), a resistive material (46) and a metallic tank ground pad. Surges entering the transformer on any of the secondary bushings of sufficient magnitude to induce gap sparkover, result in a shunting of otherwise damaging currents safely outside the transformer.

22 Claims, 3 Drawing Sheets

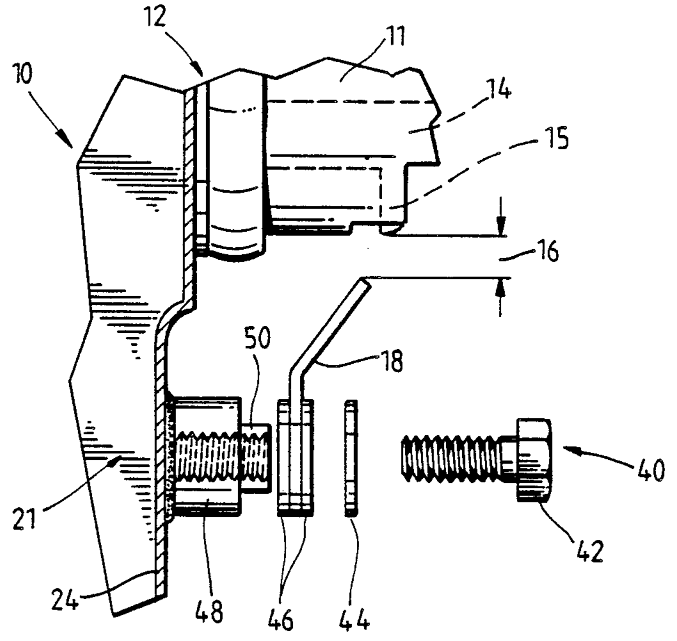
Fig.1
Fig.2
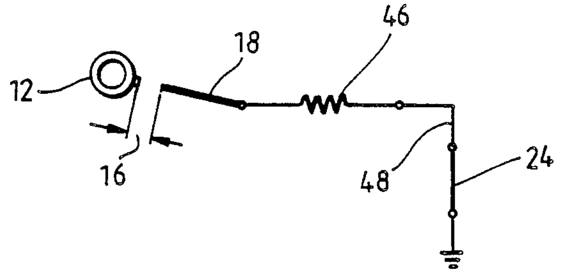
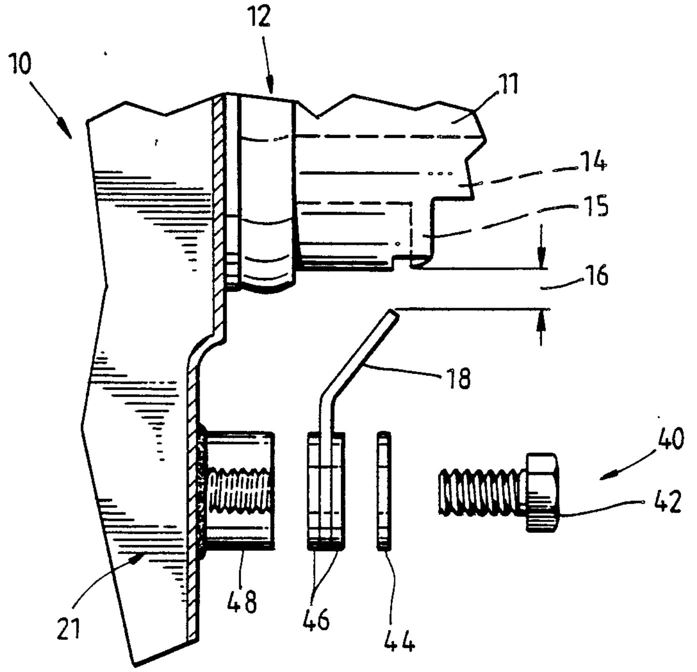
Fig.3

GAPPED ARRESTER

This is a continuation of co-pending application Ser. No. 07/164,652 filed on Mar. 7, 1988 now abandoned.

BACKGROUND OF THE INVENTION

The present invention relates to electric transformers, especially distribution transformers and to protective equipment therefor.

Investigations have been made in recent years of failures of common designs of single-phase overhead and padmounted distribution transformers caused by lightning current surges. As a result of these investigations, it has been found that anomalous failures of such transformers are attributable to lightning surges entering the transformers via the normally unprotected low voltage terminals, causing failure of the high voltage winding. By "anomalous failures" is meant failures that occur despite state-of-the-art lightning protection. Thus, it was found that high voltage arrester protection of the high voltage coil was ineffective in avoiding the problem.

Surge currents can enter the low-voltage terminals of an overhead distribution transformer in three basic ways. The first, and most obvious way, is due to direct lightning strikes on secondary service conductors. In this case, surge currents are forced through the transformer secondary windings on their way to ground at the transformer neutral. This mode of current surge may involve only one half, or the entire secondary winding.

A second possible mode of surge current entry, into the low voltage windings of a distribution transformer, is due to lightning discharge into the ground near a secondary service point. Such a discharge can cause a local elevation of ground potential resulting in ground currents flowing outward from the discharge point. Under this condition, it is possible for current to flow from the elevated potential customer ground toward the distribution transformer. Some of this current can flow through the transformer secondary windings resulting in low-side current surge. This mode is possible in both overhead and pad mounted transformers.

The third way that current surges enter low-voltage windings may be less obvious than the others, but is perhaps the most common in occurrence. Lightning strikes to overhead conductors are shunted to ground at the service pole by a ground wire running down the pole. The lightning arrester connected to the distribution transformer shunts part of the surge from the phase conductor, while the overhead neutral conductor is connected directly to the pole ground. Since the transformer neutral is also connected to this ground wire, part of the discharge current can be diverted into the secondary circuit. This mode is also possible in both pole type and in pad mounted transformers.

In this last case, surge current enters the center terminal of the low-voltage winding and divides through the two halves of the winding, exiting by way of the two secondary line terminals. For current to flow through the transformer, there must be a path through the customer load or meter. The amount of surge current may be dependent upon the amount of customer load connected at the time of the surge. Also, if there is a poor or high-resistance pole ground, a greater percentage of surge current will be diverted to the transformer windings. However, if the pole ground is adequate, the current level within the transformer will be well below that required to produce an insulation failure within the windings.

Particularly affected are the following types of conditions:

Uncompensated winding constructions, i.e., non-interlaced low voltage windings. When 3-wire surge operation occurs, e.g., surge enters X2 and departs from transformer from both X1 and X3.

Both compensated and uncompensated winding construction, i.e., both interlaced and non-interlaced low voltage windings. When 2-wire surge operation occurs, e.g., surge enters X2 and departs from transformer only on X1.

The majority of modern day distribution transformers are constructed as shell form non-interlaced low voltage and are thus susceptible to 3-wire surge operation damage.

Virtually all modern day distribution transformers are susceptible to 2-wire surge operation damage. This can happen when only one meter gap fires or when the load on X1 is substantially different from that on X3.

Presently, used schemes for protecting against low side surges and their effectiveness are as follows:

| | Balanced 3-Wire Surge | Unbalanced 2-Wire Surge |
|---|---|---|
| Interlaced low voltage | Excellent | No protection |
| Extra Primary winding layer insulation | Fair. Raises damage threshold level. Expensive | Fair. Raises damage threshold level. Expensive |
| Low voltage arrester using metal oxide varister technology | Excellent but expensive and non-visible | Excellent but expensive and non-visible |

SUMMARY OF THE INVENTION

It is an object to provide a system for protecting electric transformers, especially distribution transformers, which overcomes the disadvantage of known protective systems.

It is a particular object to provide a protective system for 3-wire divided surge current injection and for 2-wire undivided injection into the low voltage side of the transformer and for protecting such transformers particularly against anomalous failures as described above.

Another object of the invention is to provide a protective system of the above type utilizing a lightning arrester device arranged external to the tank mounted on the tank wall so that voltage surges are shunted to the tank and, hence, external to the transformer.

According to the present invention, the foregoing and other objects are accomplished by providing a surge arrester which is mounted directly on a grounded tank wall. The surge arrester is connected to a low voltage winding through a bushing stud. Surges are grounded through a spark gap onto a metallic arc strap. The metallic arc strap is mounted so that current is conducted from the metallic arc strap through a resistive grommet to a ground pad, which is electrically connected to the tank and, hence, to ground. The resistive grommet is sized to sufficiently limit power follow current during arrester operation without resulting in excessive discharge voltage across the low voltage windings due to the surge. Typical resistance is in the range of 0.3 to 3.0 ohms.

BRIEF DESCRIPTION OF THE DRAWINGS

FIG. 1 is a perspective view of a surge protection device in accordance with one form of the invention.

FIG. 2 is a circuit diagram pertaining to the transformer shown in FIG. 1.

FIG. 3 is a plan view of an embodiment of the invention using the tank wall as a grommet compression stop.

DETAILED DESCRIPTION OF THE INVENTION

Figure 4:
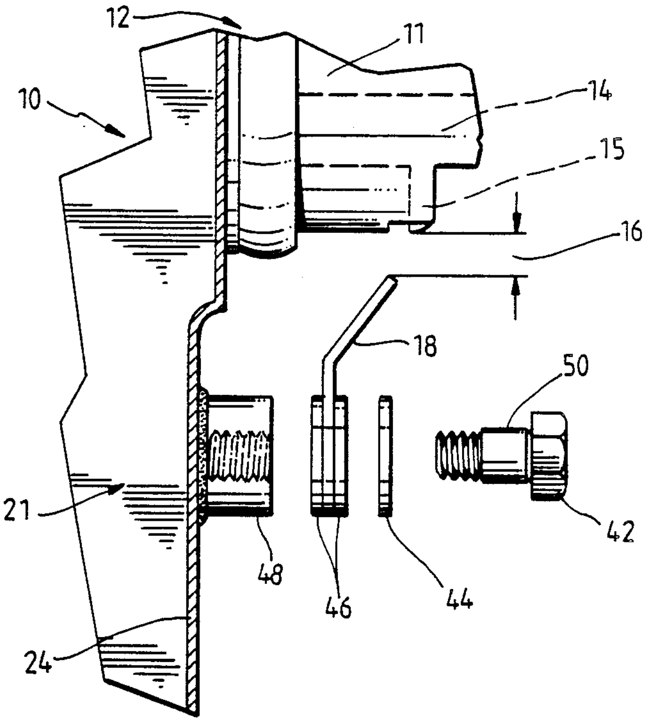
FIG. 4 is a plan view of an embodiment of the invention shown in FIG. 3 wherein a shoulder bolt serves as a grommet compression stop.

Referring now to the drawings and in particular to FIG. 1, there is shown a gapped low voltage bushing arrester designated in general by numeral 10. Arrester 10 is comprised in general of two parts, a bushing 12 and a ground bolt assembly 40. Ground bolt assembly 40 is comprised of a metallic ground pad or weld nut 48 with a shoulder 50, a resistive grommet 46, a metallic washer 44, a metallic bolt 42, and a metallic arc strap 18. Bushing 12 is comprised in general of an insulating material 11, bushing stud 14 and a gap electrode 15.

Bushing stud 14, in general, is axially mounted on tank wall 24 of distribution type transformer 21 and is made of conductive material, for example, copper. Bushing stud 14 is connected by leads not shown to the low voltage windings of a transformer and is thus at the same potential as one end of the low voltage winding.

The resistive grommet 46 is mounted on the art strap 18 which in turn is held in place on the ground pad by the bolt 42 and washer 44. The resistive grommet may be of rubber or other resistive material. The arc strap 18 is gapped approximately 3/16 inch from the bushing stud electrode.

In order to achieve the proper resistance from rubber grommet 46, it is necessary that a certain amount of compression take place on the rubber grommet. This is achieved by tightening bolt 42 until the shoulder 50 on ground pad 48 engages the lower side of the head of bolt 42, thus limiting further compression.

Figure 5:
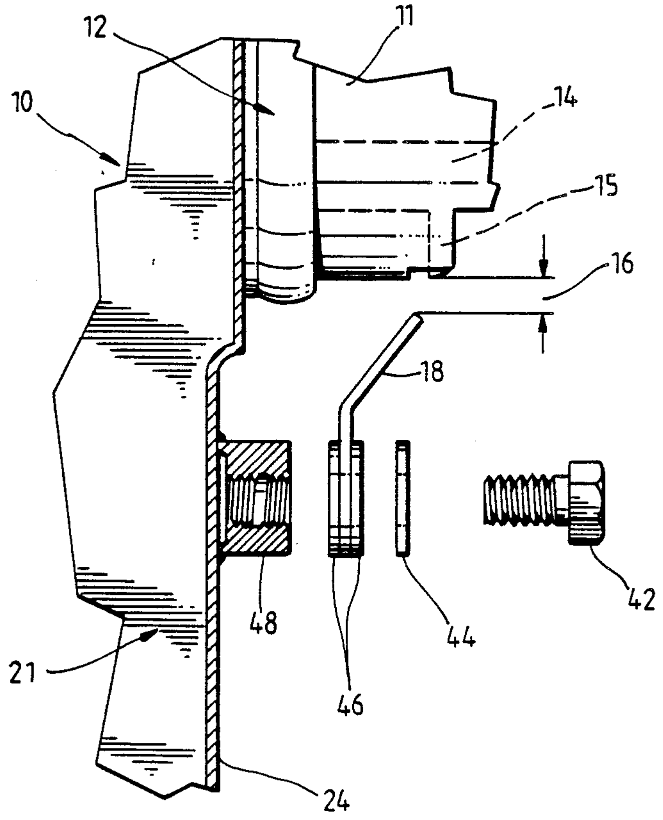
FIG. 5 is a plan view of an embodiment of the invention shown in FIG. 3 with an interrupted thread as a grommet compression stop.
Figure 6:
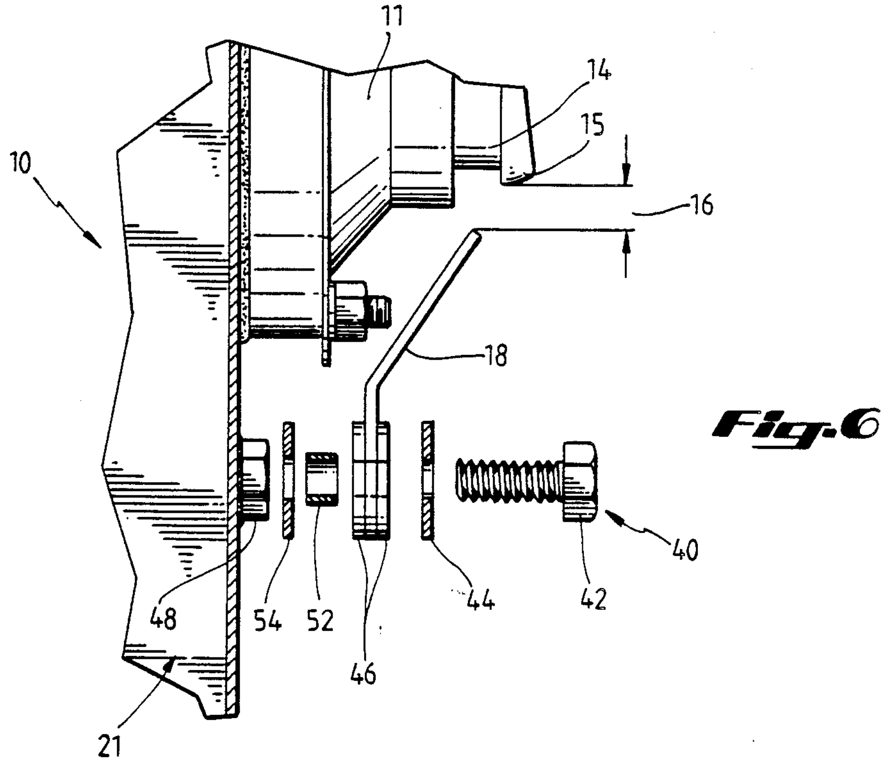
FIG. 6 is a plan view of an embodiment of the invention shown in FIG. 1 with a standard ground pad, a metallic spacer and an extra steel washer. The spacer provides the grommet compression stop and extra washer a flat seat on the ground pad.
Figure 7:
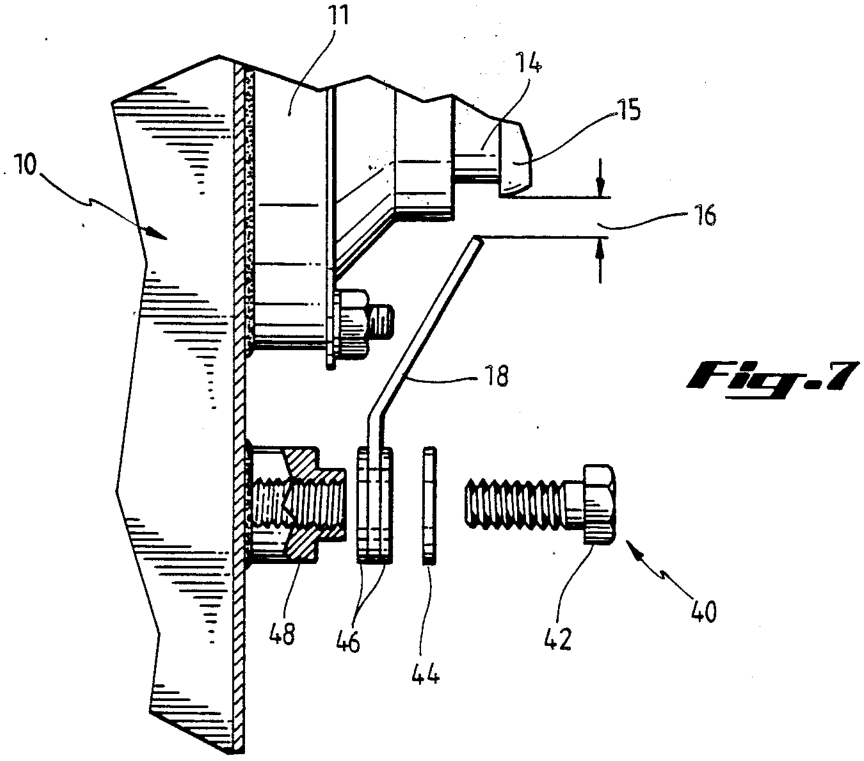
FIG. 7 is a plan view of an embodiment of the invention shown in FIG. 1 with a pad mount.

FIGS. 3 through 6 are variations wherein other means of limiting compression of grommet 46 are shown. For example, in FIG. 3, there is no shoulder, but the length of bolt 42 belongs with the depth of the thread hole on ground pad 48 which limits the travel of the bolt, thus limiting the compression of the grommet. In FIG. 4, a shoulder 50 is on bolt 42 to limit travel, and thus limit compression of grommet 46. In FIG. 5, an alternate embodiment is shown wherein ground pad is not threaded all the way to the tank wall 24. This, in combination with the length of bolt 42, once again, limits travel of bolt 42 and, hence, limits compression of grommet 46. FIG. 6 shows a variation wherein a spacer 52 provides grommet compression and washer 54 provides a flat seat on the ground pad.

In operation, referring to both FIG. 1 and FIG. 2 when a current surge occurs on the low voltage windings, a voltage is induced which will appear at the bushing stud electrode. If voltage is sufficiently high, the air in the spark gap becomes ionized and conducts current between stud and arc strap through resistive grommet to washer and bolt and ground pad to tank wall 24 and ground thus protecting transformer windings. The use of a gapped arrester in series with a resistance, such as the resistance grommet to provide protection for low voltage windings, is believed to be unique.

We claim:

1. A distribution-type transformer having a low voltage side surge arrester protector comprising:

a grounded transformer enclosure;

a high voltage transformer winding within said enclosure;

a low voltage transformer winding within said enclosure, said low voltage winding having a grounded neutral;

a low voltage bushing stud of conducting material mounted on said grounded enclosure, and insulated therefrom;

said low voltage bushing stud connected to said low voltage transformer winding; and means for dissipating surges injected into said low voltage transformer winding via said grounded neutral and via said bushing stud, said dissipating means comprising:

an arc strap adjacent to said bushing and connected to ground through a resistive material, said resistive material forming an elastomeric grommet;

a gap separating said bushing stud from said arc strap; and means for electrically connecting said grommet and said arc strap to said grounded transformer enclosure in series relationship and for compressing said grommet a predetermined amount, said connecting means including means for limiting the compression on said grommet to said predetermined amount.

2. The apparatus of claim 1 wherein said grommet is mounted on said arc strap.

3. The apparatus of claim 2 wherein said connecting means further comprises a bolt disposed through said grommet and said arc strap, said bolt engaging said grounded transformer enclosure.

4. The apparatus of claim 2 wherein said resistive material has a resistance of less than three ohms.

5. The apparatus of claim 4 wherein said gap is approximately 3/16 inch.

6. The apparatus of claim 1 wherein said resistive material is made of rubber having a resistance of less than three ohms.

7. The apparatus of claim 1 wherein said resistive material has a resistance of 0.3 to 3.0 ohms.

8. A distribution-type transformer having a low voltage side surge arrester protector comprising:

a high voltage winding;

a low voltage winding having a grounded neutral;

means for dissipating surge currents injected into said secondary winding, said dissipating means comprising;

a spark gap between one phase of said low voltage winding and ground;

a resistive mateiral in series with said spark gap, said resistive material having a resistance within the range of 0.3–3.0 ohms;

a transformer ground pad;

means for retaining said resistive material in electrical contact with said ground pad;

means for compressing said resistive material a predetermined amount; and means for limiting the compression on said resistive material to said predetermined amount.

9. The apparatus of claim 8 further comprising an arc strap electrically in series with said resistive material.

10. The apparatus of claim 9 wherein said retaining means comprises:

a central bore formed in said resistive material;

a bolt disposed through said bore and engaging said ground pad.

11. The apparatus of claim 10 wherein said resistive material comprises an elastomeric resistive grommet.

12. The apparatus of claim 10 wherein said gap is approximately 3/16 inch.

13. A surge arrester apparatus comprising:

a distribution transformer having a high voltage winding and a low voltage winding with a grounded neutral enclosed within a grounded transformer tank wall;

a secondary-side line terminal electrically connected to said low voltage winding, said secondary-side line terminal extending through said tank wall of said transformer and insulated therefrom;

a secondary-side gapped surge arrester connected between said secondary-side line terminal and said grounded tank wall, said gapped arrester comprising:

an arc adjacent to said secondary-side line terminal;

a gap separating said secondary-side line terminal and said arc strap; and an elastomeric resistive material electrically in series between said arc strap and ground, said resistive material having a resistance within the range of 0.3 to 3.0 ohms;

means for compressing said elastomeric resistive material a predetermined amount and for retaining said resistive material in electrical contact with said grounded tank wall; and means for limiting the compression on said resistive material to said predetermined amount.

14. The apparatus of claim 13 wherein said gap is approximately 3/16 inch.

15. The apparatus of claim 13 wherein said resistive material forms an elastomeric grommet.

16. The apparatus of claim 15 wherein said grommet is made of rubber.

17. The apparatus of claim 15 wherein said compressing means and said retaining means comprise a bolt disposed through said grommet and engaging said grounded tank wall.

18. An electrical distribution apparatus, comprising:

an electrically grounded enclosure including a ground pad having a threaded axial bore formed therein;

a resistive elastomeric grommet having a pair of flanges formed about its circumference and having a central aperture coaxially aligned with said threaded bore of said ground pad;

an arc strap for directing surge currents to ground through said ground pad, said arc strap having an aperture coaxially aligned with said threaded bore of said ground pad and being disposed between said flanges of said resistive grommet; and a bolt with threaded shank extending through said apertures of said resistive grommet and said arc strap threadingly engaging said axial bore in said ground pad.

19. The apparatus of claim 18 wherein said resistive grommet is rubber.

20. The apparatus of claim 18 wherein said resistive grommet is compressed.

21. The apparatus of claim 18 wherein the resistance of said resistive grommet is less than 3.0 ohms.

22. The apparatus of claim 18 wherein the resistance of said resistive grommet is 0.3 to 3.0 ohms.

* * * * *